United States Patent
Konitzer et al.

(10) Patent No.: US 11,786,973 B2
(45) Date of Patent: Oct. 17, 2023

(54) METHOD FOR MANUFACTURING A COMPONENT USING AN ADDITIVE PROCESS

(71) Applicant: General Electric Company, Schenectady, NY (US)

(72) Inventors: Douglas Gerard Konitzer, West Chester, OH (US); Andrew William Emge, West Chester, OH (US); Andrew Ezekiel Wessman, Tucson, AZ (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/126,245

(22) Filed: Dec. 18, 2020

(65) Prior Publication Data

US 2022/0193770 A1   Jun. 23, 2022

(51) Int. Cl.
*B22F 10/28* (2021.01)
*B22F 10/66* (2021.01)
*B22F 10/64* (2021.01)
*B22F 12/41* (2021.01)
*B33Y 10/00* (2015.01)
(Continued)

(52) U.S. Cl.
CPC ............... *B22F 10/28* (2021.01); *B22F 5/04* (2013.01); *B22F 10/36* (2021.01); *B22F 10/38* (2021.01); *B22F 10/64* (2021.01); *B22F 10/66* (2021.01); *B22F 12/41* (2021.01); *B22F 12/47* (2021.01); *B22F 2203/00* (2013.01); *B33Y 10/00* (2014.12); *B33Y 40/20* (2020.01); *B33Y 50/02* (2014.12); *B33Y 80/00* (2014.12)

(58) Field of Classification Search
CPC .. B22F 10/28; B22F 5/04; B22F 10/36; B22F 10/38; B22F 10/64; B22F 10/66; B22F 12/41; B22F 12/47; B22F 2203/00; B22F 2998/10; B22F 2999/00; B22F 5/009; B22F 10/366; B33Y 10/00; B33Y 40/20; B33Y 50/02; B33Y 80/00; Y02P 10/25
See application file for complete search history.

(56) References Cited

U.S. PATENT DOCUMENTS 3,954,514 A   5/1976 Webster et al.
4,710,345 A   12/1987 Doi et al.
(Continued)

FOREIGN PATENT DOCUMENTS

EP              3663878 A1      6/2020
WO       WO2020/122992 A1      6/2020
WO       WO-2020122992 A1 *    6/2020

OTHER PUBLICATIONS

Gibson, Ian, et al. Additive Manufacturing Technologies: Rapid Prototyping to Direct Digital Manufacturing. Springer, 2010. (Year: 2010).*

*Primary Examiner* — Anthony M Liang
*Assistant Examiner* — Danny N Kang
(74) *Attorney, Agent, or Firm* — Dority & Manning, P.A.

(57) ABSTRACT

A method for additively manufacturing components includes additively printing a metallic preform such that the preform contains a predetermined amount of porosity. Furthermore, the method includes working the additively printed preform such that the preform incurs a predetermined amount of deformation. Moreover, the method includes heat treating the worked preform to form a final component.

13 Claims, 5 Drawing Sheets

(51) Int. Cl.
  *B33Y 50/02*   (2015.01)
  *B33Y 80/00*   (2015.01)
  *B22F 10/36*   (2021.01)
  *B22F 12/47*   (2021.01)
  *B22F 10/38*   (2021.01)
  *B22F 5/04*    (2006.01)
  B33Y 40/20     (2020.01)

(56) References Cited

U.S. PATENT DOCUMENTS

| | | |
|---|---|---|
| 5,766,380 A | 6/1998 | Lo et al. |
| 5,826,160 A | 10/1998 | Kecskes |
| 8,147,749 B2 | 4/2012 | Reynolds |
| 10,220,434 B2 | 3/2019 | Bush et al. |
| 2016/0339522 A1 | 11/2016 | Kajino et al. |
| 2017/0306447 A1 | 10/2017 | Lin et al. |
| 2017/0328207 A1 | 11/2017 | Bunker |
| 2019/0001437 A1 | 1/2019 | Mathisen et al. |
| 2019/0134711 A1 | 5/2019 | Li |

\* cited by examiner

METHOD FOR MANUFACTURING A COMPONENT USING AN ADDITIVE PROCESS

FIELD

The present disclosure generally pertains to methods for additively manufacturing components, such as turbomachine components, and, more specifically, to methods for achieving recrystallization in the material of an additively manufacturing component.

BACKGROUND

In recent years, the use of additive manufacturing methods, such as direct metal laser melting (DMLM) or directed metal laser sintering (DMLS), has increased dramatically. In general, additive manufacturing methods allow the formation of component features (e.g., passages, chambers, void, and the like) that cannot otherwise be formed using conventional casting and machining processes. As such, turbomachine components that require complex internal geometries, such as gas turbine engine vanes, blades, and fuel nozzles, are one example of components that are now commonly formed using additive manufacturing methods. However, additively manufactured components may have an undesirable grain structure. For example, such components may have elongated surface grains and striated interior grains, which may limit the operational loads that can be placed thereon.

Accordingly, an improved method for additively manufacturing components that provides better control of the grain structure would be welcomed in the additive technology in general, and specifically in the field of turbomachines.

BRIEF DESCRIPTION

Aspects and advantages of the invention will be set forth in part in the following description, or may be obvious from the description, or may be learned through practice of the invention.

In one aspect, the present subject matter is directed to a method for additively manufacturing components. The method includes additively printing a metallic preform such that the preform contains a predetermined amount of porosity. Furthermore, the method includes working the additively printed preform such that the preform incurs a predetermined amount of deformation. Moreover, the method includes heat treating the worked preform to form a final component.

In another aspect, the present subject matter is directed to a method for additively manufacturing components having a recrystallized grain structure with a target grain size. The method includes forming a metallic preform by an additive manufacturing process and controlling process parameters of the additive manufacturing process to impart a predetermined amount of porosity to the preform. The preform, in turn, includes a material having an initial grain structure with a grain size different from the target grain structure. Furthermore, the method includes working the preform isostatically to uniformly impart a predetermined amount of deformation to the material. Moreover, the method includes heat treating the worked preform to recrystallize the material and form a final component having the target grain size.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
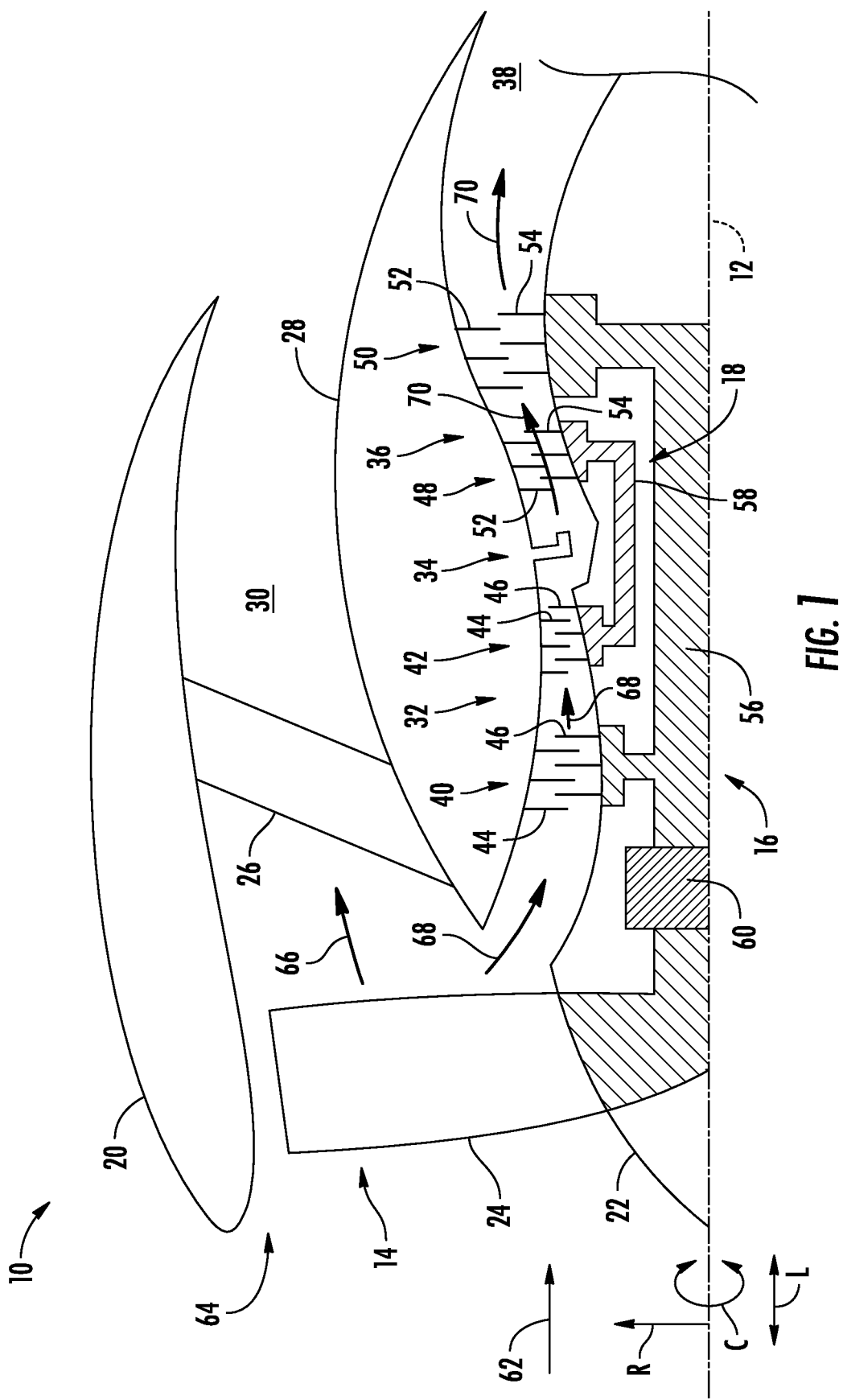
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a method for additively manufacturing components. As will be described below, in one embodiment, the method may be used to form various turbomachine components, such as gas turbine engine blades, vanes, shroud blocks, fuel nozzles, and the like, but it should be understood that the method is not limited to turbomachine components. Specifically, in several embodiments, the method includes additively printing a metallic preform such that the preform contains a predetermined amount of porosity. Such porosity is formed by not fully melting or fusing the metallic powder used to additively print the preform, thereby leaving pores or voids between the powder particles. As such, the amount of porosity may be controlled based on the energy/power output of, the speed of, and/or the number of passes made by an electromagnetic radiation beam (e.g., a laser beam) used in the additive printing process. Furthermore, the method includes working the additively printed preform such that the preform incurs a predetermined amount of deformation. For example, in one embodiment, the preform is worked/deformed via a cold isostatic pressing operation. Additionally, the method includes annealing or otherwise heat treating the worked preform to form the final component.

Forming components using additively printed preforms containing porosity provides one or more technical advantages. More specifically, conventional additively printed preforms that are subsequently worked and heat treated are fully dense structures, or nearly dense structures. That is, metallic powder forming the preforms is fully melted during the additive printing process such that substantially no pores or voids are present within the structures. Working (e.g. cold isostatic pressing) a fully or nearly fully dense preform does not sufficiently or uniformly deform the preform to allow for recrystallization of metal during heat treatment. Retained deformation is necessary to achieve recrystallization, and if the deformation is insufficient or non-uniform, the resulting component may have an undesirable grain structure (e.g., elongated surface grains and striated interior grains). However, as described above, the method disclosed herein includes forming a preform containing a predetermined amount of porosity. To state differently, a pre-determined amount of porosity is intentionally added into the additively printed component during the additive printing process. This porosity allows the preform to achieve a greater amount of deformation when being worked, with such deformation being uniform. As such, the disclosed method produces components having an improved grain structure (e.g., equi-axed grains of a desired size) such that higher operational loads can be placed thereon.

Referring now to the drawings, FIG. 1 is a schematic cross-sectional view of one embodiment of a gas turbine engine 10, which is one non-limiting example of where components made by the method of the disclosure may be utilized. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine. Furthermore, as shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high-pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween. However, in alternative embodiments, the engine 10 may have an open rotor configuration in which the nacelle 20 is not present.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 65 of the LP turbine 50 and the rotor blades 54 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. In other embodiments, the LP shaft 56 may directly drive the fan 14 (i.e., the engine 10 does not include the gearbox 60). The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines. Additionally, the present subject matter may be readily adaptable to other fields of use outside gas turbine engines, including any use where the component are subjected to high loads where controlled, uniform grain structure is necessary for the material properties of the component.

Figure 2:
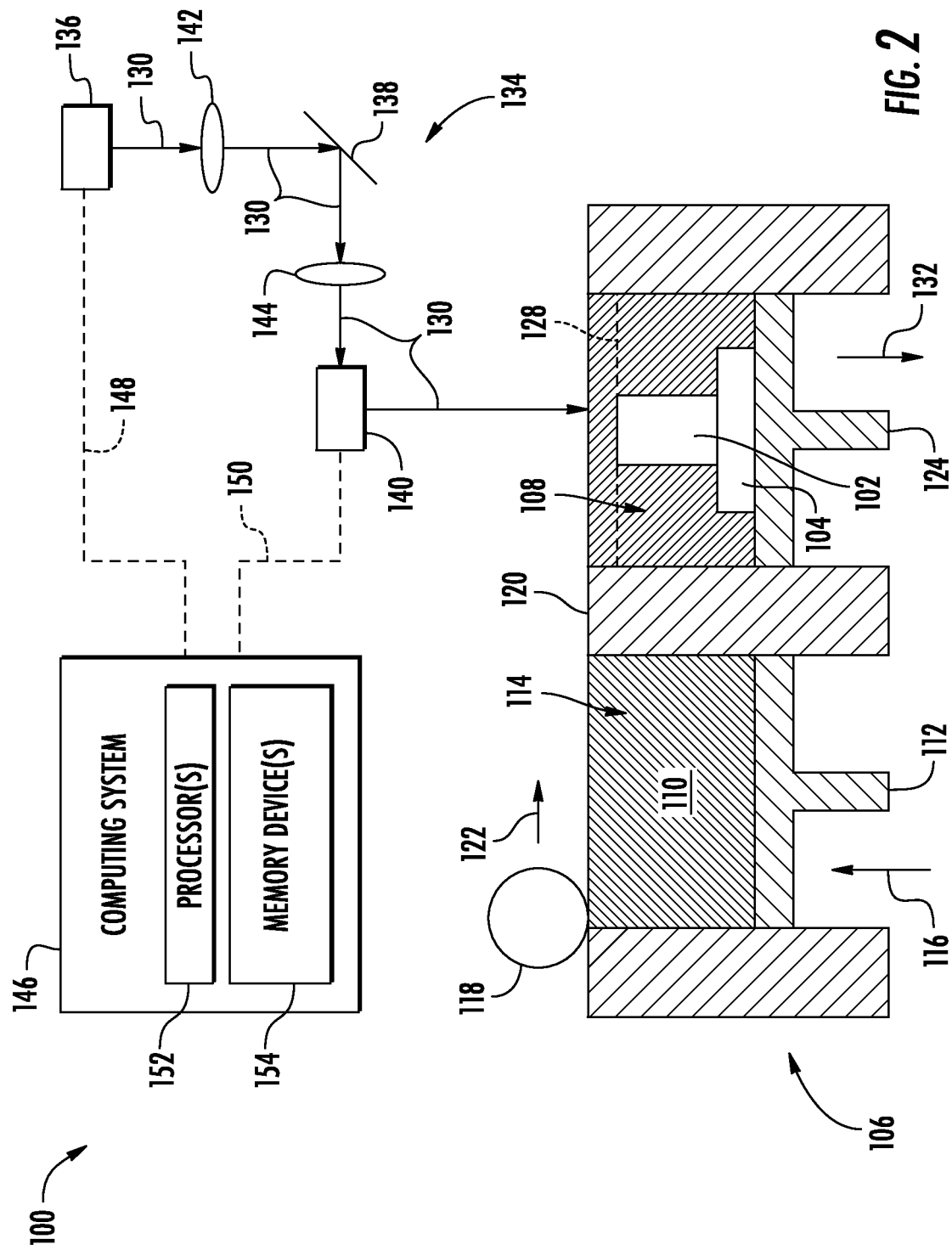
FIG. 2 is a diagrammatic view of one embodiment of an additive manufacturing machine.

FIG. 2 is a side view of one embodiment of an additive manufacturing machine 100. As will be described below, the additive manufacturing machine 100 is configured to additively print one or more metallic preforms 102 containing a predetermined amount of porosity using one or more additive manufacturing techniques or processes. The additively printed preform(s) 102 is subsequently worked (e.g., via a cold isostatic pressing operation) and heat treated to form a final component(s), such as a component(s) of the engine 10.

As used herein, the terms "additively manufacturing" or "additive manufacturing techniques or processes" refer to manufacturing processes in which successive layers of material are deposited on top of each other to build-up, layer-by-layer, a three-dimensional component. The successive layers are then partially melted or fused together to form a monolithic or integral component having a predetermined amount of porosity.

In several embodiments, the additive manufacturing machine 100 uses a powder bed fusion (PBF) technique, as direct metal laser melting (DMLM) or directed metal laser sintering (DMLS). In such embodiments, the preform(s) 102 are additively printed on a build plate 104 by depositing a first layer of powder onto the build plate, melting or fusing a second layer of powder on top of the first layer, melting or fusing a third layer of powder on top of the second layer, and so on. Furthermore, in alternative embodiments, the additive manufacturing machine 100 may use any other suitable additive manufacturing technique(s) or process(es).

As shown, the additive manufacturing machine 100 includes a powder supply assembly 106 and a build chamber 108. In general, the powder supply assembly 106 provides a supply of powder 110 to the build chamber 108 for use in additively printing the preform(s) 102. Specifically, in several embodiments, the powder supply assembly 106 includes a powder piston 112 positioned within a powder supply chamber 114 containing the powder 110. In this respect, the powder piston 112 may be raised (e.g., as indicated by arrow 116) within the powder supply chamber 114, thereby forcing a portion of the powder 110 out of the powder supply chamber 114. Moreover, the powder supply assembly 106 includes a recoater 118, such as a roller or a blade/wiper, that pushes the powder 110 expelled from the powder supply chamber 114 across a work surface 120 and into the build chamber 108 (e.g., as indicated by arrow 122).

Moreover, the additive manufacturing machine 100 includes a build platform 124 and the build plate 104 positioned within the build chamber 108. More specifically, as shown, the build plate 104 is positioned on the build platform 124 and secured thereto via a suitable chuck system (not shown). The preform(s) 102 is, in turn, additively printed on the build plate 104. During printing of the preform(s) 102, the recoater 118 fills the build chamber 108 with the powder 110 until the powder 110 forms a build plane (indicated by dashed line 40) at the same vertical position as the top surface of the build plate 104. Next, the recoater 118 spreads a layer of the powder 110 across the build plane 128. The layer of powder 110 is then partially melted or fused together using one or more electromagnetic radiation beams 130 to form a first layer(s) of the preform(s) 102. Thereafter, the build platform 124 is lowered (e.g., as indicated by arrow 132) before the recoater 118 spreads another layer of the powder 110 across the build plane 128. This layer may then be partially melted or fused to the first layer(s) using the beam(s) 130 to form a second layer(s) of the extension segment(s) and so on. As will be described below, the layers of the preform(s) 102 are only partially melted or fused together by the electromagnetic radiation beam(s) 16. In this respect, the preform(s) 102 contains a predetermined amount of porosity. FIG. 2 shows the position of the build plane 128 after several layers of the illustrated preform 102 have been formed.

Additionally, the additive manufacturing machine 100 includes a print head 134. In general, the print head 134 generates and directs an electromagnetic radiation beam 130 at the build plane 128, thereby allowing the powder 110 spread across the build plane 128 to be partially melted/fused. As shown, in several embodiments, the print head 134 includes a beam emitter 136 (e.g., a laser diode), a mirror 138, and a galvanometer 140. More specifically, the beam emitter 136 emits the electromagnetic radiation beam 130 (e.g., a laser beam) at the mirror 138. The mirror 138, in turn, directs the emitted beam 130 at the galvanometer 140, and the galvanometer 140 directs the beam 130 at a specific location on the build plane 128. In this respect, when additively printing the preform(s) 102, the galvanometer 140 scans the beam 130 over the portion of the build plane 128 at which it desired to partially melt or fuse the powder 110 to form a layer(s) of the preform(s) 102. Moreover, in one embodiment, the print head 134 may include a first lens 142 positioned between the beam emitter 136 and the mirror 138 and a second lens 144 positioned between the mirror 138 and the galvanometer 140 to focus the beam 130. However, in alternative embodiments, the print head 134 may have any other suitable configuration.

The additive manufacturing machine 100 may include any suitable number of print heads 134. For example, in the illustrated embodiment, the additive manufacturing machine 100 includes a single print head 134. However, in alternative embodiments, the additive manufacturing machine 100 may include a two or more print heads 134.

Furthermore, the additive manufacturing machine 100 may include a computing system 146 communicatively coupled to one or more components of the additive manufacturing machine 100 to allow the computing system 146 to electronically or automatically control the operation of such components. For instance, the computing system 146 may be communicatively coupled to the beam emitter 136 of the print head 134 via a communicative link 148. As such, the computing system 146 may be configured to control the operation of the beam emitter 136 such that an electromagnetic radiation beam 130 is generated. Moreover, the computing system 146 may be communicatively coupled to the galvanometer 140 of the print head 134 via a communicative link 150. In this respect, the computing system 146 may be configured to control the operation of the galvanometer 140 such that the electromagnetic radiation beam 130 is scanned across the build plane 128 to partially melt or fuse the powder 110 present of the build plane 128 to form the preform(s) 102. Additionally, the computing system 146 may be communicatively coupled to any other suitable components (e.g., the recoater 118) of the additive manufacturing machine 100.

In general, the computing system 146 may comprise one or more processor-based devices, such as a given controller or computing device or any suitable combination of controllers or computing devices. Thus, in several embodiments, the computing system 146 may include one or more processor(s) 152 and associated memory device(s) 154 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 154 of the computing system 146 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 154 may generally be configured to store suitable computer-readable instructions that, when implemented by the processor(s) 152, configure the computing system 146 to perform various computer-implemented functions, such as one or more aspects of the methods and algorithms that will be described herein. In addition, the computing system 146 may also include various other suitable components, such as a communications circuit or module, one or more input/output channels, a data/control bus and/or the like.

The various functions of the computing system 146 may be performed by a single processor-based device or may be distributed across any number of processor-based devices. In such instances, such processor-based devices may form part of the computing system 146. For instance, the functions of the computing system 146 may be distributed across multiple application-specific controllers, such an additive manufacturing device controller, a controller(s)/computing device(s) of a remote device(s) (e.g., a laptop, a desktop, a server, etc.), and/or the like.

The configuration of the additive manufacturing machine 100 described above and shown in FIG. 2 is provided only to place the present subject matter in an exemplary field of use. Thus, the present subject matter may be readily adaptable to any manner of additive manufacturing machine, including additive manufacturing machines that use different additive manufacturing techniques or processes.

Figure 3:
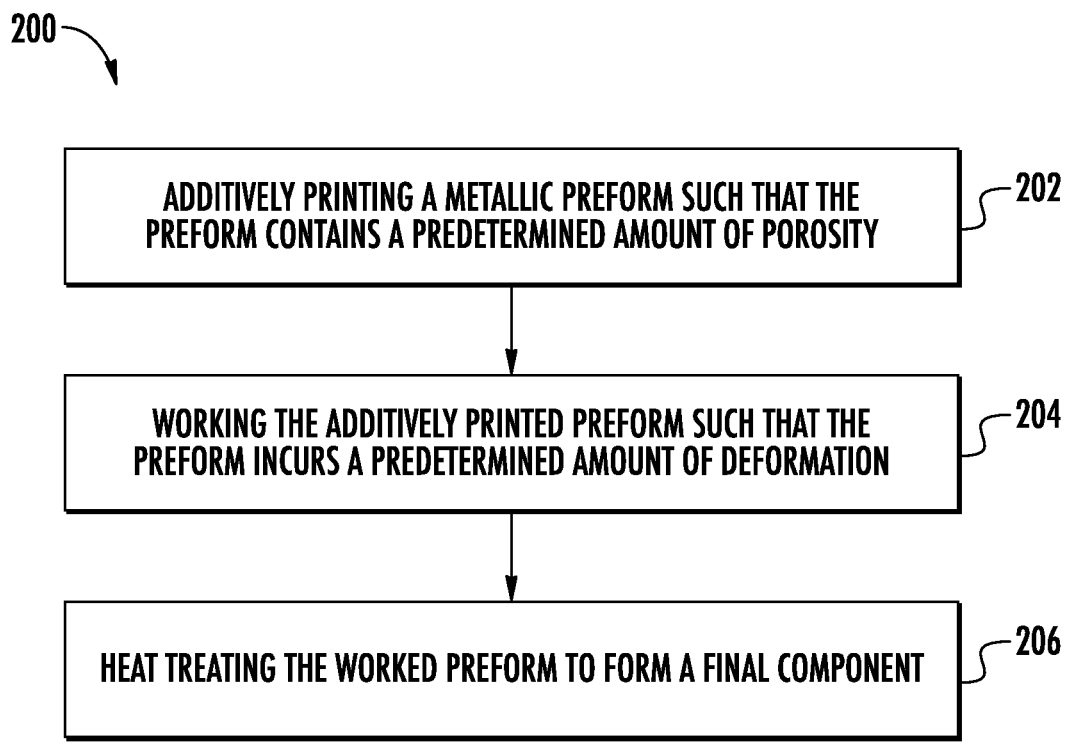
FIG. 3 is a flow diagram of one embodiment of a method for additively manufacturing components.

FIG. 3 is a flow diagram of one embodiment of a method 200 for additively manufacturing components. In general, the method 200 will be discussed in the context of the additive manufacturing machine 100 described above and shown in FIG. 2. However, the disclosed method 200 may be implemented with any additive manufacturing machine having any suitable configuration. In addition, although FIG. 3 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

As shown, at (202), the method 200 may include additively printing a metallic preform such that the preform contains a predetermined amount of porosity. For example, in some embodiments, the additive manufacturing machine 100 may be configured to additively print one or more metallic preform(s) 102 using, e.g., a powder bed fusion (PBF) technique, such as direct metal laser melting (DMLM) or directed metal laser sintering (DMLS). The additively printed preform(s) 102 are subsequently worked and heat treated to form one or more final component(s) (e.g., a component(s) of the engine 10). The porosity present in the preform(s) 102 improves the grain structure of the final component(s) formed from such preform(s) 102. As will be described below, the specific predetermined amount of porosity within the preform(s) may be selected based on the desired grain size of the final component(s). However, in alternative embodiments, any other suitable additive manufacturing machine(s) and/or technique(s)/process(es) may be used to additively print the metallic preform(s) 102.

Figure 4:
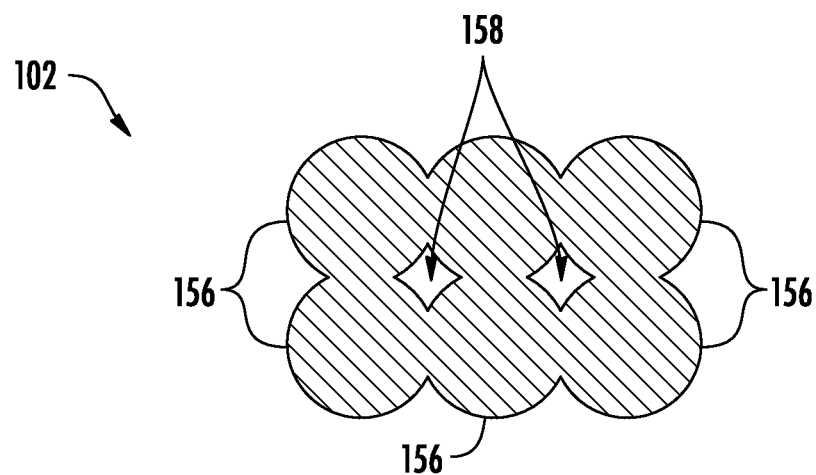
FIG. 4 is a partial cross-section of an additively printed preform, particularly illustrating the porosity present within the preform.

In several embodiments, the predetermined amount of porosity is formed in the preform(s) 102 by only partially melting or fusing the particles of the powder 110 used to additively print the preform(s) 102. By only partially melting or fusing the powder particles, voids are left between the particles, thereby creating the porosity in the preform(s) 102. For example, FIG. 4 is a partial cross-sectional view of an additively printed preform 102 containing porosity. As shown, the preform 102 contains several powder particles 156 that have been partially melted/fused together, leaving voids 158 between the partially melted/fused particles. For example, the predetermined amount of porosity may be between 0.005 percent and sixty percent, such as between 0.01 and fifty percent, between 0.1 and forty percent, or between 1 and thirty percent.

The amount of porosity within the metallic preform(s) 102 may be controlled based on one or more operating parameters of the additive manufacturing machine 100. In several embodiments, the amount of porosity in the preform(s) 102 may be controlled based on the speed at which the electromagnetic radiation beam 130 used to additively print the preform(s) 102 is moved relative to the preform(s) 102. More specifically, to increase the porosity of the preform(s) 102, the speed of the beam 130 may be increased. For example, in such instances, the computing system 146 may control the operation of the galvanometer 140 (e.g., by transmitting control signals thereto via the communicative link 150) such that the galvanometer 140 increases the speed at which the beam 130 is scanned across the build plane 128. Conversely, to decrease the porosity of the preform(s) 102, the speed of the beam 130 may be decreased. For example, in such instances, the computing system 146 may control the operation of the galvanometer 140 such that the galvanometer 140 decreases the speed at which the beam 130 is scanned across the build plane 128.

In addition or as an alternative to controlling beam speed, the amount of porosity in the preform(s) 102 may be controlled based on the number of passes the electromagnetic radiation beam 130 makes across the preform(s) 102. More specifically, to increase the porosity of the preform(s) 102, the number of passes made by the beam 130 may be decreased. For example, in such instances, the computing system 146 may control the operation of the galvanometer 140 (e.g., by transmitting control signals thereto via the communicative link 150) such that the galvanometer 140 scans the beam 130 across the build plane 128 a reduced number of times. Conversely, to decrease the porosity of the preform(s) 102, the number of passes made by the beam 130 may be increased. For example, in such instances, the computing system 146 may control the operation of the galvanometer 140 (e.g., by transmitting control signals thereto via the communicative link 150) such that the galvanometer 140 scans the beam 130 across the build plane 128 an additional number of times.

Furthermore, in addition or as an alternative to controlling beam speed and/or number of passes, the amount of porosity in the preform(s) 102 may be controlled based on the energy or power output of the beam 130. More specifically, to increase the porosity of the preform(s) 102, the energy of the beam 130 may be decreased. For example, in such an instance, the computing system 146 may control the operation of the beam emitter 136 (e.g., by transmitting control signals thereto via the communicative link 148) such that the beam emitter 136 decreases the energy or power output of the beam 130. Conversely, to decrease the porosity of the preform(s) 102, the energy of the beam 130 may be increased. For example, in such instances, the computing system 146 may control the operation of the beam emitter 136 such that the beam emitter 136 increases the energy or power output of the beam 130. However, in alternative embodiments, any other suitable operating parameter(s) of the additive manufacturing machine 100 may be adjusted to control the porosity of the preform(s) 102.

Moreover, in some embodiments, the additive manufacturing machine 100 may be controlled such that preform(s) 102 has different amounts of porosity in different zones or areas. For example, in one embodiment, at (202), the method 200 includes additively printing a first portion(s) of the preform(s) 102 having a first predetermined amount of porosity and additively printing a second portion(s) of the preform(s) 102 having a second, different predetermined amount of porosity. In such an embodiment, the speed of, the energy/power output of, and/or number of passes by the beam 130 of the additive manufacturing machine 100 may be adjusted when switching between additively printing the first and second portions such that the first portion(s) of the preform(s) 102 has the first predetermined amount of porosity and the second portion(s) of the preform(s) 102 has the second predetermined amount of porosity. However, in alternative embodiments, the preform(s) 102 may have single amount of porosity throughout the preform(s) or three or more regions of differing porosities.

Additionally, at (202), the preform(s) 102 may be formed from any suitable metallic material(s). For example, such metallic material(s) may include nickel alloys, chrome alloys, titanium, titanium alloys, magnesium, magnesium alloys, aluminum, aluminum alloys, iron, iron alloys, stainless steel, nickel- or cobalt-based superalloys (e.g., those available under the name Inconel® available from Special Metals Corporation), and the like.

Furthermore, as shown in FIG. 3, at (204), the method 200 includes working the additively printed preform such that the preform incurs a predetermined amount of deformation. Specifically, in several embodiments, the additively printed preform(s) 102 containing the predetermined amount of porosity may be worked or otherwise deformed using any suitable process. Such porosity, in turn, allows the preform(s) 102 to deform to a greater extent than a fully dense preform. For example, in some embodiments, the preform(s) 102 may be worked or deformed using a cold-working process. Moreover, in some embodiments, the preform(s) 102 may be worked or deformed using an isostatic process. In one embodiment, the preform(s) 102 may be worked or deformed using a cold isostatic pressing process. In certain embodiments, the predetermined amount of deformation is 2-60 percent cold work, for example 3-40 percent cold work, 4-30 percent cold work, or 5-20 percent cold work.

Figure 5:
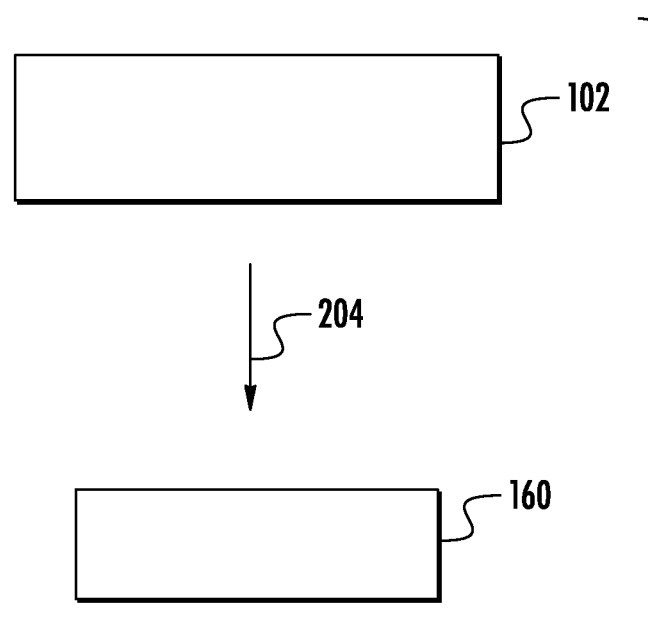
FIG. 5 is a side view of one embodiment of an additively printed preform before incurring deformation and after incurring deformation.

In general, the working of the preform(s) 102 at (204) deforms the additively printed preform(s) 102 such that the worked preform(s) 102 have the size and/or shape of the final component(s) being formed by the method 200. For example, in some embodiments, the final component(s) may be smaller than the preform(s) 102 but have the same shape and aspect ratio. For example, as shown in FIG. 5, a preform 102 may be worked at (204) such that a resulting worked preform 160 may be smaller than the unworked preform(s) 102 but have the same shape and aspect ratio. By way of example and not limitation, the preform may be worked to achieve a uniform size reduction of 2-60 percent, for example 3-40 percent, 4-30 percent, or 5-20 percent.

Additionally, as shown in FIG. 3, at (206), the method 200 includes heat treating the worked preform to form a final component. More specifically, the worked or deformed preform(s) may be annealed or otherwise heat treated in a furnace (not shown). Such heat treating may recrystallize the deformed preform(s) and relieve residual stresses, thereby forming the final component(s). Suitable parameters for the heat treatment to obtain recrystallization are within the ordinary skill, and are dependent on the particular metal being recrystallized.

The grain size of the final component(s) produced by the method 200 may be controlled based on the amount of porosity within the additively printed preform(s) 102 and the amount of deformation (e.g., the percent cold work) to the preform(s) 102. For example, increasing the amount of porosity and the amount of deformation results in smaller grains. Conversely, decreasing the amount of porosity and the amount of deformation results in larger grains. Therefore, in certain embodiments, the method 200 may include selecting the predetermined amount of porosity that, in combination with a selected amount of deformation, will result in a desired (target) grain structure in the component for a given course of heat treatment, for example a uniform an equiaxed grain size of a desired (target) value or within a desired (target) range. Further, in certain embodiments, the method 200 may include selecting the process parameters of the additive process that will impart the predetermined amount of porosity. Further yet, in certain embodiments, the method 200 may include selecting the amount of deformation to be imparted to the additively printed preform that, in combination with the predetermined amount of porosity, will result in the desired grain structure in the heat-treated component. By way of example and not limitation, the grain size of the printed preform may be on the order of 20-30 µm and may be recrystallized and the uniform and equiaxed grain size may be on the order of 10-15 µm in the heat-treated final component as a result of the intentionally imparted porosity and deformation.

The method 200 provides one or more technical advantages. More specifically, as described above, the method 200 includes forming, at (202), a metallic preform 102 containing a predetermined amount of porosity. This porosity allows the preform 102 to achieve a greater amount of deformation when being worked at (204) than a fully dense preform, with such deformation being uniform. As such, the method 200 produces components having an improved grain structure (e.g., equiaxed grains of a desired size) such that higher operational loads can be placed thereon. The method further allows for control of the amount of porosity and deformation to achieve a desired (target) grain structure.

Figure 6:
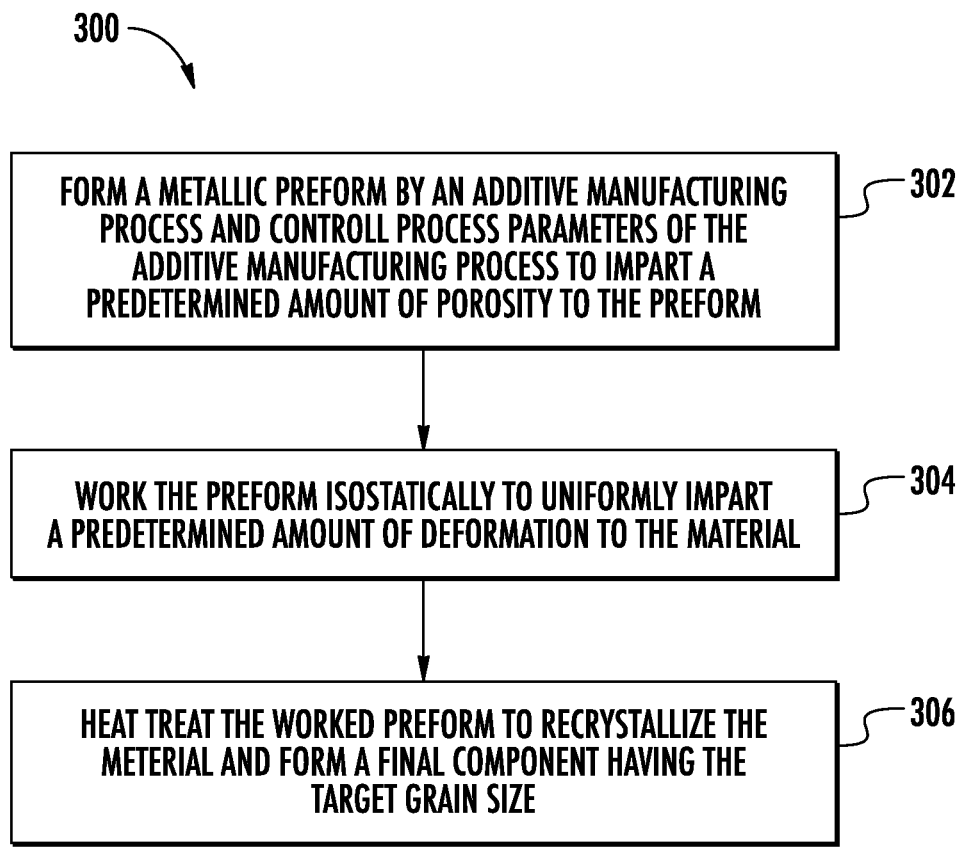
FIG. 6 is a flow diagram of one embodiment of a method for additively manufacturing turbomachine components.

FIG. 6 is a flow diagram of one embodiment of a method 300 for additively manufacturing components having a recrystallized grain structure with a target grain size. In general, the method 300 will be discussed in the context of the gas turbine engine 10 and the additive manufacturing machine 100 described above and shown in FIGS. 1 and 2. However, the disclosed method 300 may be used to form components of any other suitable application, such as any other turbomachine, and implemented with any additive manufacturing machine having any suitable configuration. In addition, although FIG. 6 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

In several embodiments, the method 300 may be used to form a component(s) of the engine 10. For example, in some embodiments, the preform(s) 102 may be used to form a fan blade(s) 24, a compressor vane(s) 44, a compressor blade(s) 46, a turbine vane(s) 52, and/or turbine blade(s) 54 of the engine 10. However, in alternative embodiments, the preform(s) 102 may correspond to any suitable component(s), such as other component(s) of a turbomachine (e.g., a shroud block(s), a fuel nozzle(s), etc.) or component(s) of any other turbomachine.

As shown in FIG. 6, at (302), the method 300 includes forming a metallic preform by an additive manufacturing process and controlling process parameters of the additive manufacturing process to impart a predetermined amount of porosity to the preform. For example, as described above, the additive manufacturing machine 100 may be configured to additively print one or more metallic preform(s) 102 containing a predetermined amount of porosity for use in forming a turbomachine component(s).

Furthermore, at (304), the method 300 includes working the preform isostatically to uniformly impart a predetermined amount of deformation to the material. For example, as described above, the additively printed preform(s) 102 containing the predetermined amount of porosity may be worked or otherwise deformed using any suitable process.

Additionally, at (306), the method 300 includes heat treating the worked preform to recrystallize the material and form a final component having the target grain size. For example, as described above, the worked or deformed preform(s) may be annealed or otherwise heat treated to form the turbomachine component(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for additively manufacturing components, the method comprising: additively printing a metallic preform such that the preform contains a predetermined amount of porosity; working the additively printed preform such that the preform incurs a predetermined amount of deformation; and heat treating the worked preform to form a final component.

The method of one or more of these clauses, wherein a grain size of the final component is based on the predetermined amount of porosity contained by the preform and the predetermined amount of deformation incurred by the preform.

The method of one or more of these clauses, wherein additively printing the metallic preform comprises additively printing the metallic preform using a powder bed fusion technique.

The method of one or more of these clauses, wherein additively printing the metallic preform comprises controlling a speed at which an electromagnetic radiation beam used to additively print the metallic preform is moved relative to the metallic preform such that the metallic preform contains a predetermined amount of porosity.

The method of one or more of these clauses, wherein additively printing the metallic preform comprises controlling a number of passes across the metallic preform that an electromagnetic radiation beam used to additively print the metallic preform makes such that the metallic preform contains a predetermined amount of porosity.

The method of one or more of these clauses, wherein additively printing the metallic preform comprises controlling an energy of an electromagnetic radiation beam used to additively print the metallic preform such that the metallic preform contains a predetermined amount of porosity.

The method of one or more of these clauses, wherein additively printing the metallic preform comprises: additively printing a first portion of the metallic preform such that the first portion has a first predetermined amount of porosity; and additively printing a second portion of the metallic preform such that the second portion has a second predetermined amount of porosity, the second predetermined amount of porosity being different than the first predetermined amount of porosity.

The method of one or more of these clauses, wherein working the additively printed preform comprises cold working the additively printed preform such that the preform incurs the predetermined amount of deformation.

The method of one or more of these clauses, wherein working the additively printed preform comprises isostatically working the additively printed preform such that the preform incurs the predetermined amount of deformation.

The method of one or more of these clauses, wherein working the additively printed preform comprises cold isostatic pressing the additively printed preform such that the preform incurs the predetermined amount of deformation.

The method of one or more of these clauses, further comprising: selecting the predetermined amount of porosity and the predetermined amount of deformation that, in combination, will impart a desired grain structure in the final component upon heat treating the worked preform.

The method one or more of these clauses, wherein the final component is a turbomachine component.

The method of one or more of these clauses, wherein the turbomachine component comprises at least one of a gas turbine engine blade or a gas turbine engine vane.

A method for additively manufacturing components having a recrystallized grain structure with a target grain size, the method comprising: forming a metallic preform by an additive manufacturing process and controlling process parameters of the additive manufacturing process to impart a predetermined amount of porosity to the preform, the preform comprising a material having an initial grain structure with a grain size different than the target grain structure; working the preform isostatically to uniformly impart a predetermined amount of deformation to the material; and heat treating the worked preform to recrystallize the material and form a final component having the target grain size.

The method of one or more of these clauses, further comprising: selecting the predetermined amount of porosity and the predetermined amount of deformation that, in combination, will produce the target grain size in the final component upon heat treating the worked preform.

The method of one or more of these clauses, wherein controlling the process parameters comprises controlling a speed at which an electromagnetic radiation beam used to additively print the metallic preform is moved relative to the metallic preform.

The method of one or more of these clauses, wherein controlling the process parameters comprises controlling a number of passes across the metallic preform by an electromagnetic radiation beam used to additively print the metallic preform.

The method of one or more of these clauses, wherein controlling the process parameters comprises controlling an energy of an electromagnetic radiation beam used to additively print the metallic preform.

The method of one or more of these clauses, wherein working the preform isostatically comprises cold isostatic pressing the preform to impart a percent cold work in the range of 2-60 percent.

What is claimed is:

1. A method for additively manufacturing components, the method comprising:
    additively printing a metallic preform such that the metallic preform contains a predetermined amount of porosity intentionally added into the additively printed component during the additive printing, wherein the predetermined amount of porosity is 0.005% to 60% by volume, wherein additively printing the metallic preform comprises:
        controlling a speed at which an electromagnetic radiation beam used to additively print the metallic preform is moved relative to the metallic preform such that the metallic preform contains the predetermined amount of porosity,
        controlling a number of passes across the metallic preform that the electromagnetic radiation beam makes such that the metallic preform contains the predetermined amount of porosity, and
        controlling an energy of the electromagnetic radiation beam such that the metallic preform contains the predetermined amount of porosity;
    working the metallic preform such that the metallic preform incurs a predetermined amount of deformation; and
    heat treating the worked metallic preform to form a final component, wherein a grain size of the final component is based on the predetermined amount of porosity contained by the metallic preform and the predetermined amount of deformation incurred by the metallic preform.

2. The method of claim 1, wherein additively printing the metallic preform comprises additively printing the metallic preform using a powder bed fusion technique.

3. The method of claim 1, wherein additively printing the metallic preform comprises:
    additively printing a first portion of the metallic preform such that the first portion has a first predetermined amount of porosity; and
    additively printing a second portion of the metallic preform such that the second portion has a second predetermined amount of porosity, the second predetermined amount of porosity being different than the first predetermined amount of porosity.

4. The method of claim 1, wherein working the metallic preform comprises cold working the metallic preform such that the metallic preform incurs the predetermined amount of deformation.

5. The method of claim 1, wherein working the metallic preform comprises isostatically working the metallic preform such that the metallic preform incurs the predetermined amount of deformation.

6. The method of claim 1, wherein working the metallic preform comprises cold isostatic pressing the metallic preform such that the metallic preform incurs the predetermined amount of deformation.

7. The method of claim 1, further comprising:
    selecting the predetermined amount of porosity and the predetermined amount of deformation that, in combination, will impart a desired grain structure in the final component upon heat treating the worked metallic preform.

8. The method of claim 1, wherein the final component is a turbomachine component.

9. The method of claim 8, wherein the turbomachine component comprises at least one of a gas turbine engine blade or a gas turbine engine vane.

10. The method of claim 1, wherein the metallic preform has an initial grain structure, and wherein the grain size of the final component is a recrystallized grain structure different than the initial grain structure.

11. The method of claim 1, working the metallic preform is performed isostatically to uniformly impart the predetermined amount of deformation to the metallic preform.

12. The method of claim 11, wherein working the metallic preform isostatically comprises cold isostatic pressing the metallic preform to impart a percent cold work in a range of 2% to 60%.

13. A method for additively manufacturing components, the method comprising:
    additively printing a metallic preform such that the metallic preform contains a predetermined amount of porosity intentionally added into the additively printed component during the additive printing, wherein the predetermined amount of porosity is 0.005% to 60% by volume, wherein additively printing the metallic preform comprises at least one of:
        controlling a speed at which an electromagnetic radiation beam used to additively print the metallic preform is moved relative to the metallic preform such that the metallic preform contains the predetermined amount of porosity,
        controlling a number of passes across the metallic preform that the electromagnetic radiation beam makes such that the metallic preform contains the predetermined amount of porosity, or controlling an energy of the electromagnetic radiation beam such that the metallic preform contains the predetermined amount of porosity;

working the metallic preform such that the metallic preform incurs a predetermined amount of deformation; and heat treating the worked metallic preform to form a final component, wherein a grain size of the final component is based on the predetermined amount of porosity contained by the metallic preform and the predetermined amount of deformation incurred by the metallic preform.

\* \* \* \* \*